United States Patent
Boyd

(10) Patent No.: US 7,953,453 B2
(45) Date of Patent: *May 31, 2011

(54) INTEGRATED MOBILE PHONE RING SCHEDULER

(75) Inventor: Martha Karen Boyd, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 530 days.

This patent is subject to a terminal disclaimer.

(21) Appl. No.: 12/025,989

(22) Filed: Feb. 5, 2008

(65) Prior Publication Data

US 2008/0125185 A1     May 29, 2008

Related U.S. Application Data

(63) Continuation of application No. 10/764,812, filed on Jan. 26, 2004, now Pat. No. 7,353,047.

(51) Int. Cl.
     *H04M 1/00*          (2006.01)

(52) U.S. Cl. .................... 455/567; 455/401; 455/456.1; 379/82

(58) Field of Classification Search .................. 455/567, 455/401, 456.1; 379/82
See application file for complete search history.

(56) References Cited

U.S. PATENT DOCUMENTS

| | | | |
|---|---|---|---|
| 5,317,624 A | 5/1994 | Obana et al. |
| 5,323,444 A | 6/1994 | Ertz et al. |
| 5,379,337 A | 1/1995 | Castillo et al. |
| 5,448,630 A | 9/1995 | Barstow |
| 6,141,556 A | 10/2000 | Dougherty et al. |
| 6,347,133 B1 | 2/2002 | Galbreath |
| 6,359,970 B1 | 3/2002 | Burgess |
| 6,560,222 B1 | 5/2003 | Pounds et al. |
| 6,584,490 B1 | 6/2003 | Schuster et al. |
| 6,611,533 B1 | 8/2003 | Liao et al. |
| 6,636,242 B2 | 10/2003 | Bowman Amuah |
| 6,640,249 B1 | 10/2003 | Bowman-Amuah |
| 6,690,929 B1 | 2/2004 | Yeh |
| 6,707,889 B1 | 3/2004 | Saylor et al. |
| 6,714,635 B1 | 3/2004 | Adams et al. |
| 6,738,616 B1 | 5/2004 | Link, II et al. |
| 6,748,054 B1 | 6/2004 | Gross et al. |
| 6,748,057 B2 | 6/2004 | Ranalli et al. |
| 6,748,062 B2 | 6/2004 | Alcott et al. |
| 6,748,318 B1 | 6/2004 | Jones |
| 6,754,323 B1 | 6/2004 | Chang et al. |
| 6,760,581 B2 | 7/2004 | Dutta |
| 6,763,105 B1 | 7/2004 | Miura et al. |
| 6,768,788 B1 | 7/2004 | Langseth et al. |
| 6,813,491 B1 | 11/2004 | McKinney |
| 6,819,922 B1 | 11/2004 | Janz |

(Continued)

OTHER PUBLICATIONS

International Search Report and Written Opinion of the International Searching Authority for International Application No. PCT/US05/01077, mailed on Jun. 21, 2005.

*Primary Examiner* — Nghi H Ly

(74) *Attorney, Agent, or Firm* — Toler Law Group

(57) ABSTRACT

A mobile telephone comprises a ringer to provide an audible alert of an incoming telephone call. The mobile telephone has a ringer control schedule. The ringer control schedule indicates times at which a parameter of the ringer is to change. The mobile telephone further comprises a ringer controller to automatically change the parameter of the ringer according to the ringer control schedule.

18 Claims, 1 Drawing Sheet

U.S. PATENT DOCUMENTS

| | | | |
|---|---|---|---|
| 6,831,970 B1 * | 12/2004 | Awada et al. | 379/201.01 |
| 6,968,216 B1 | 11/2005 | Chen et al. | |
| 7,050,573 B2 | 5/2006 | Okazaki et al. | |
| 7,353,047 B2 * | 4/2008 | Boyd | 455/567 |
| 2002/0052225 A1 * | 5/2002 | Davis et al. | 455/567 |

* cited by examiner

INTEGRATED MOBILE PHONE RING SCHEDULER

CLAIM OF PRIORITY

The present application is a continuation of and claims priority from U.S. patent application Ser. No. 10/764,812 filed on Jan. 26, 2004, the contents of which is expressly incorporated herein by reference in its entirety.

FIELD OF THE DISCLOSURE

The present disclosure relates to methods and systems for controlling the ringer of a mobile telephone.

BACKGROUND

In the last decade, cellular and other mobile telephones have evolved from tools used only by professionals for business applications to the newest must-have gadgets for teens and pre-teens. Families have begun to depend on mobile telephones as communication tools to stay in touch with their very mobile members.

Public schools and universities are struggling to provide structure and rules for the use of mobile phones so that students can use this valuable tool without interrupting classes. It is easy for a student to forget to turn off a cellular phone ringer before going into a class, or to remember to turn it off but then forget to turn it back on after school.

Existing systems to inhibit a ringer of a mobile telephone in a school or like environment use an outside device (separate from the phone) to control the operation of the phone. The outside device may comprise a device at a geographical location in which a ringer-less environment is desired (such as a hospital, a concert hall, a library or a classroom). Alternatively, a transmission tower of a wireless service provider may control whether the ringer is to be on or off based on the geographical location of the phone.

DETAILED DESCRIPTION

Figure 1:
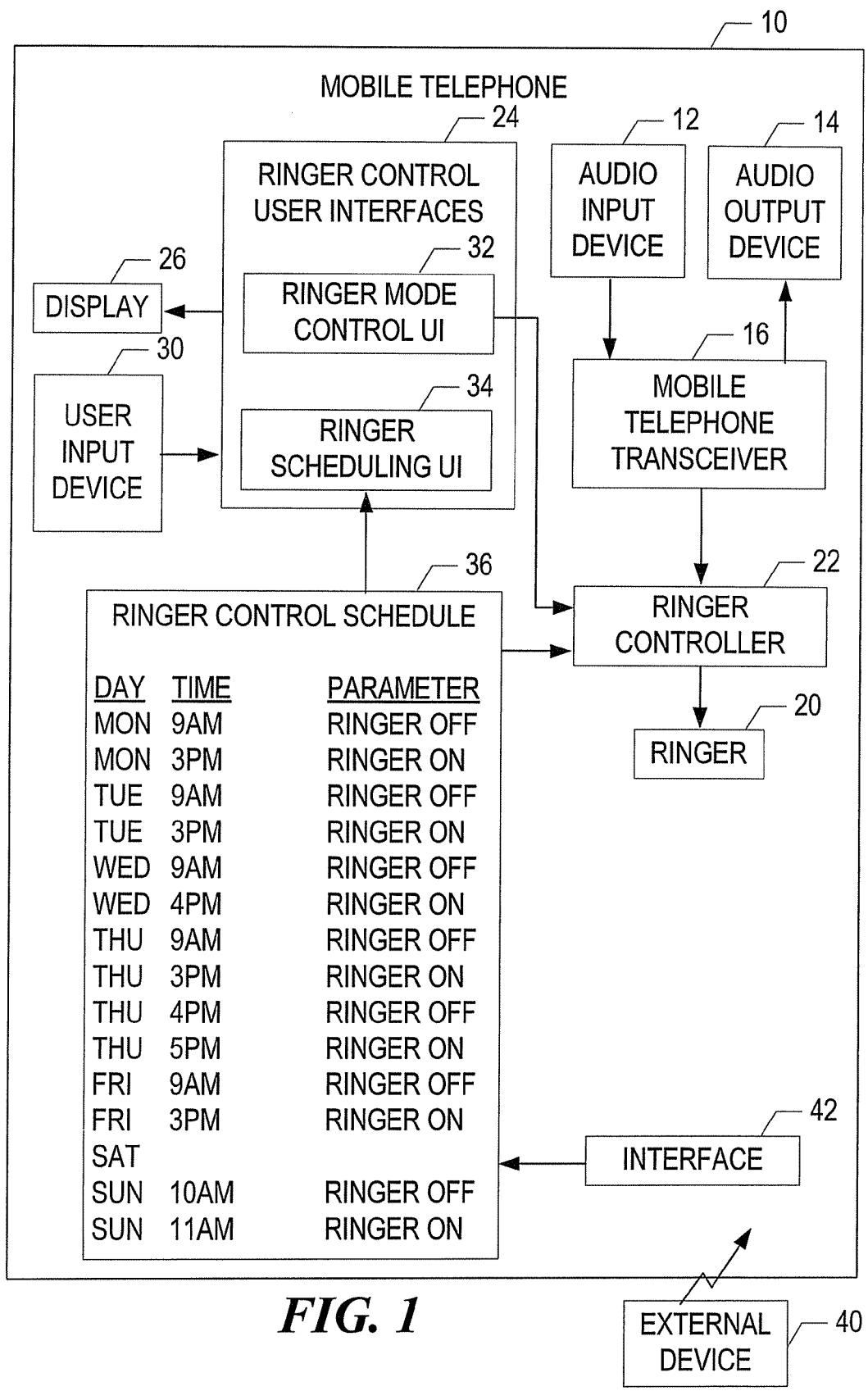
FIG. 1 is a block diagram that illustrates a mobile telephone having ringer control user interfaces.

There is a need to provide an easy, self-contained way for mobile phone users to ensure that their phone ringers are turned off at times when mobile phone use is either prohibited or discouraged, and then automatically turned on at times when mobile phone use is allowed, without requiring other location-based and/or network-based devices.

To address this need and other needs, a mobile telephone is adapted to include a ringer scheduling user interface in addition to conventional ringer mode controls. The ringer scheduling user interface allows a telephone ringer control schedule to be entered and activated for the mobile telephone. Through this user interface, a user can control, for each day of the week, one or more times at which one or more ringer parameters are to change, and a new value the parameter is to assume at the specified time. At any time, the user may choose to manually control the phone ringer to override the schedule, and may choose to reactivate the schedule at a later time. Using embodiments of the herein-disclosed mobile telephone, teens and parents can ensure that phone ringers are turned off during school hours, and then turned on after school to allow the parent to call the telephone.

The drawing shows a block diagram of an embodiment of a mobile telephone 10. As with other mobile telephones, the mobile telephone 10 comprises an audio input device 12 such as a microphone, an audio output device 14 such as a speaker, and a mobile telephone transceiver 16 such as a cellular, PCS, or satellite transceiver, to enable users to place and receive wireless telephone calls. The mobile telephone transceiver 16 can communicate in any of a variety of different communication protocols, including but not limited to Global System for Mobile Communication (GSM), Code Division Multiple Access (CDMA), Time Division Multiple Access (TDMA), and Integrated Dispatch Enhanced Network (iDEN).

A ringer 20, which is capable of audibly alerting a user of an incoming telephone call or an incoming text or picture message received by the mobile telephone transceiver 16, is controlled by a ringer controller 22. For each incoming call, the ringer controller 22 determines whether or not the ringer is to generate the audible alert signal based on whether the mobile telephone 10 is in a ringer-on mode or a ringer-off mode. In the ringer-on mode, the ringer controller 22 generates the audible alert signal based on other parameters such as a user-selected ringer volume level and a user-selected ring tone. In some embodiments, the ringer controller 22 may generate different ring tones dependent on whether a phone call or a message is received, and based on caller identification for phone calls.

The mobile telephone 10 provides user interfaces 24 to control parameters of the ringer 20. The user interfaces 24 are displayed using a display device 26, and receive user input using a user input device 30. The display device 26 may comprise a color or a monochrome liquid crystal display to display textual and/or graphical information. The user input device 30 may comprise any combination of telephone dialing keys, soft keys, and a multi-way navigation device such as a 4-way or a 5-way navigation device to receive user inputs.

The ringer control user interfaces 24 comprise a ringer mode control user interface 32. The ringer mode control user interface 32 provides conventional ringer control features such as volume control and selection of ring tones.

The ringer control user interfaces 24 further comprise a ringer schedule user interface 34. The ringer schedule user interface 34 receives a ringer control schedule 36 indicating times at which a parameter of the ringer 20 is to change. The ringer control user interface 34 uses the display device 26 to display at least part or all of the ringer control schedule 36, and uses the user input device 30 to receive user commands to create at least part or all of the ringer control schedule 36.

In one embodiment, the ringer control schedule 36 indicates, for each day of the week, the times at which the parameter is to change. Changes in the parameter of the ringer 20 may comprise any of turning the ringer 20 off, turning the ringer 20 on, changing a ring tone for the ringer 20, and changing a ring volume for the ringer 20. For example, the ringer control schedule 36 may comprise for a particular day of the week a first time that the ringer is to be turned off and a second time that the ringer is to be turned back on. In general, some days of the week may have the same scheduled times and parameter changes, while other days of the week may have different scheduled times and parameter changes.

Either as an alternative to or in addition to using the ringer schedule user interface 34, at least part or all of the ringer control schedule 36 may be created using an external device 40. The external device 40 may comprise a personal computer or a personal digital assistant having software that provides an embodiment of a ringer schedule user interface. The external device 40 interfaces with an interface 42 of the mobile telephone 10. The external device 40 downloads part or all of the ringer schedule 36, which is received by the interface 42 for storage in the mobile telephone 10. The interface 42 may comprise a short-range wireless interface such as a BLUETOOTH interface, a wireline interface such as a data port of the mobile telephone 10, or an alternative interface.

For purposes of illustration and example, consider the user of the mobile telephone 10 being a student who has classes on Monday through Friday from 9:00 AM to 3:00 PM. The student has after-school debate team meetings on Wednesdays from 3:00 PM to 4:00 PM, and attends band practices on Thursdays from 4:00 PM to 5:00 PM. The student attends religious services on Sundays from 10:00 AM to 11:00 AM. The drawing depicts an example of the ringer control schedule 36 having times and parameter changes to make sure the ringer 20 is not active during the student's classes, debate team meetings, band practices, and religious services, but is active at all other times. The schedules for Mondays, Tuesdays and Fridays are the same, but differ from the schedules for Wednesdays, Thursdays, and Sundays. No parameter changes are scheduled for Saturdays.

The ringer controller 22 automatically changes the parameter of the ringer 20 according to the ringer control schedule 36. The ringer controller 22 may function on a call-by-call basis wherein the time and day of week of an incoming call is matched to the ringer control schedule 36 to determine how or if the ringer is to alert the user of the incoming call. Alternatively, the ringer controller 22 may change the parameters of the ringer 20 at the times/days indicated in the ringer control schedule 36.

In one embodiment, the ringer mode control user interface 32 provides options to allow the user to override the ringer control schedule 36, and thereafter to return to processing incoming calls based on the ringer control schedule 36. Overriding the ringer control schedule 36 may comprise making the ringer 20 active when the schedule 36 indicates that the ringer 20 is to be off, or making the ringer 20 inactive when the schedule indicates that the ringer 20 is to be on. Continuing with the above example, if the student's debate team meeting is canceled for a particular Wednesday, the student may override the ringer control schedule 36 and make the ringer 20 active at 3:00 PM on that particular Wednesday.

The ringer control schedule 36 is stored in a computer-readable medium of the mobile telephone 10. Examples of the computer-readable medium include, but are not limited to, a magnetic storage medium and an electronic storage medium. Preferably, the ringer control schedule 36 is stored in a non-volatile memory of the mobile telephone 10.

Acts performed by the mobile telephone 10 may be directed by computer program code stored in a computer-readable medium of the mobile telephone 10.

It will be apparent to those skilled in the art that the disclosed embodiments may be modified in numerous ways and may assume many embodiments other than the preferred forms specifically set out and described herein.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A mobile telephone comprising:
   a transceiver to receive incoming telephone calls;
   a ringer to provide an audible alert of the incoming telephone calls according to a parameter;
   a ringer controller to automatically set the parameter of the ringer to a value of a parameter indication of a day-time instance in a ringer control schedule, the ringer control schedule indicating a plurality of successive day-time instances, each day-time instance including the parameter indication that is set to one value of a plurality of values; and
   a control to instruct the ringer controller to override the automatically set parameter of the ringer to another value,
   wherein the ringer controller is adapted to automatically set the parameter of the ringer by matching a day and time of an incoming call to a day-time instance of the ringer control schedule on a call-by-call basis.

2. The mobile telephone of claim 1, wherein each of the day-time instances further includes a day of a week and a time of the day.

3. The mobile telephone of claim 2, wherein the ringer control schedule includes at least two successive day-time instances for a day of a week, a first successive day-time instance including a first time of a first day and the parameter indication that is set to a first value of the plurality of values and a second successive day-time instance including a second time of the first day and the parameter indication that is set to a second value of the plurality of values.

4. The mobile telephone of claim 3, wherein the first value indicates the parameter of the ringer is to be set to off and the second value indicates that the parameter of the ringer is to be set to on.

5. The mobile telephone of claim 2, wherein the ringer control schedule includes one day-time instance for a day of a week, the one day-time instance including a time of a day and the parameter indication that is set to a null value.

6. The mobile telephone of claim 5, wherein the null value indicates the parameter of the ringer is not to be set for the day of the week.

7. The mobile telephone of claim 1, wherein the value of the parameter of the ringer indicates one of turning the ringer off, turning the ringer on, changing a ring tone, and changing a ring volume.

8. The mobile telephone of claim 1, further comprising:
   a display device;
   a user input device; and
   a ringer schedule interface adapted to receive at least part of the ringer control schedule via the user input device, the ringer schedule interface further adapted to display at least a part of the ringer control schedule via the display device.

9. The mobile telephone of claim 1, further comprising:
   an interface to an external device; and
   a ringer schedule interface adapted to receive at least part of the ringer control schedule from the external device via the interface.

10. The mobile telephone of claim 9, wherein the interface is one of a wireless interface and a wired interface.

11. A machine-readable medium including instructions executable by the machine to control a mobile telephone, the machine-readable medium causing the machine to:
    receive incoming telephone calls via a transceiver;
    provide via a ringer an audible alert of the incoming telephone calls according to a parameter;

automatically set the parameter of the ringer to a value of a parameter indication of a day-time instance in a ringer control schedule, the ringer control schedule indicating a plurality of successive day-time instances, each day-time instance including the parameter indication that is set to one value of a plurality of values; and override the automatically set parameter of the ringer to another value, wherein the parameter of the ringer is automatically set by matching a day and time of an incoming call to a day-time instance of the ringer control schedule on a call-by-call basis.

12. The machine-readable medium of claim 11, wherein each of the day-time instances further includes a day of a week and a time of the day.

13. The machine-readable medium of claim 12, wherein the ringer control schedule includes at least two successive day-time instances for a day of a week, a first successive day-time instance including a first time of a first day and the parameter indication that is set to a first value of the plurality of values and a second successive day-time instance including a second time of the first day and the parameter indication that is set to a second value of the plurality of values.

14. The machine-readable medium of claim 13, wherein the first value indicates the parameter of the ringer is to be set to off and the second value indicates that the parameter of the ringer is to be set to on.

15. The machine-readable medium of claim 12, wherein the ringer control schedule includes one day-time instance for a day of a week, the one day-time instance including a time of a day and the parameter indication that is set to a null value.

16. The machine-readable medium of claim 15, wherein the null value indicates the parameter of the ringer is not to be set for the day of the week.

17. The machine-readable medium of claim 11, wherein the value of the parameter of the ringer indicates one of turning the ringer off, turning the ringer on, changing a ring tone, and changing a ring volume.

18. The machine-readable medium of claim 11, further comprising instructions causing the machine to receive at least part of the ringer control schedule via a user input device and to display at least a part of the ringer control schedule via a display device and further comprising instructions causing the machine to receive at least part of the ringer control schedule from an external device via an interface.

* * * * *